Oct. 17, 1939.  S. D. BOYNTON  2,176,565
VALVE FOR INFLATABLE ARTICLES
Filed March 10, 1937
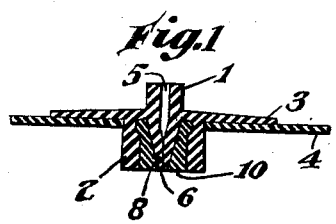
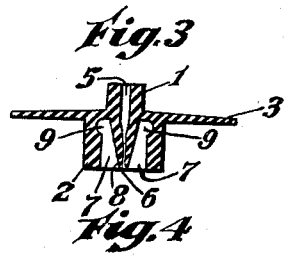
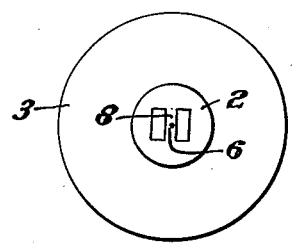
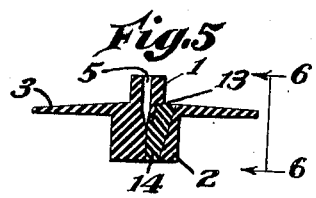
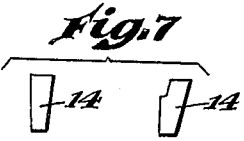
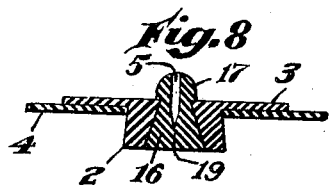
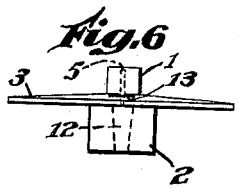
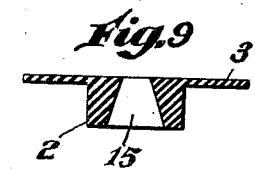
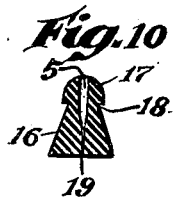
Inventor
Solon D. Boynton
by
Spear Rawlings & Spear
Attorneys Patented Oct. 17, 1939

2,176,565

UNITED STATES PATENT OFFICE 2,176,565

VALVE FOR INFLATABLE ARTICLES

Solon D. Boynton, Boston, Mass.

Application March 10, 1937, Serial No. 130,116

7 Claims. (Cl. 273—65)

My present invention relates to improvements in the construction of valves for use with such inflatable articles as football and basketball bladders.

For many years such bladders were closed against air leakage after inflation by the simple expedient of folding the stem and binding the end thereof and the stem tightly together as with elastic bands.

Bladders now are generally provided with a stem having a normally closed aperture, which aperture is adapted to be opened by a hollow inflating tool through which air may be pumped into the bladder and to close again tightly when said tool is withdrawn.

The closing of the aperture through the stem tightly enough to prevent the leakage of air and yet to permit the facile insertion and withdrawal of the inflating tool is the problem which has demanded considerable attention. The closure has been effected in several ways as by the use of a disc or like rubber member pinching the stem or by forming the stem with a sufficiently large aperture to receive a rubber plug which may be provided with an aperture to receive the inflating tool or the inflating tool may be inserted between the plug and the stem wall.

In accordance with my invention I have provided for the closure of the aperture in any of the above-mentioned ways by the use of wedges adapted to be inserted in recesses shaped to receive them, which wedges and recesses are so formed that the valve may be readily assembled to provide an aperture closing tightly at its inner or lower end through a minimum but adequate zone so that the inflating tool may be inserted and withdrawn without excessive frictional resistance.

Included in my invention is the use of novel wedge retaining means adapted to permit the wedges to be snapped into position with relative ease and to resist any forces tending to dislodge them.

In the drawing I have shown preferred embodiments of my invention of which drawing:

Fig. 1 is a view in cross section of an assembled valve.

Fig. 2 shows one of the wedges.

Fig. 3 is a view similar to Fig. 1 with the wedges removed.

Fig. 4 is a bottom plan view of the assembled valve shown in Fig. 1.

Fig. 5 is a view in cross section of a modified valve assembly.

Fig. 6 shows the valve assembly in elevation as viewed along the lines 6—6 of Fig. 5.

Fig. 7 shows front and side views of the wedge used in the form of valve shown in Fig. 5.

Fig. 8 illustrates another modification of my invention in cross section.

Fig. 9 shows the hub member in cross section, and

Fig. 10 is a view in cross section of the wedge member.

I have indicated at 1 a stem moulded integrally with the rubber hub 2 having a flange 3 adapted to be cemented to either surface of the bladder 4. At 5 I have shown a bore extending through the stem 1 and into the hub 2, the bore 5 being of a diameter substantially that of the usual inflating tool, not shown. A fine air passage 6 in communication with the bore 5 extends through the hub 2, which air passage 6 must be normally tightly closed in order to prevent leakage of air from the bladder 4.

The hub 2 is formed with a recess 7 on opposite sides of the passage 6 with the recesses 7 being wedge-shaped with the walls adjacent the passage 6 tapering to define a tip 8. The recesses 7 extend above and laterally of the lower end of the bore 5 and are formed with pockets 9.

I provide a wedge 10 for each of the recesses 7. If desired, the recesses 7, the wedge members 10 or both may be curved. The wedges 10 are preferably of harder material than that from which the hub 2 is moulded. If the wedge members are moulded from the same material as that used for the hubs 2, the wedges 10 are considerably thicker than those shown in the drawing. The wedges 10 are shaped with reference to the recesses 7 and are formed with protuberances 11 adapted to enter the pockets 9 when the wedges 10 are inserted. The wedges 10 are shaped to effect the greatest wedging action at the lower end to pinch the tip 8 to seal effectively the passage 6 against the leakage of air. It will be noted that the wedges 10 may be readily inserted as the upper ends of the recesses 7 are in the zone of the lower portion of the bore 5 so that the rubber between the bore 5 and the recesses 7 will yield sufficiently to permit the wedge to be inserted with the protuberances in the pockets 9. The upper parts of the wedges 10 are formed with particular reference to the size and shape of the recesses 7 to fit tightly therein rather than to effect any substantial wedging at this point and are preferably, as shown, of less width than the maximum width of the recesses 7.

In Fig. 5 I have shown a modified form of my invention in which the bore 5 extends into the hub 2 and communicates with an enlarged recess 12 through the hub 2, which recess 12 has a laterally disposed entrance 13 separated from the bore 5 and partially blocked by the stem 1. One wall of the recess 12 is in alignment with the bore 5. As may be seen from a comparison of Figs. 5 and 6, the recess 12 is wedge-shaped whether viewed from the position shown in Fig. 5 or at right angles thereto as shown in Fig. 6.

The wedge 14, which may be of harder rubber than that from which the hub 2 is moulded, is adapted to be inserted into the recess 12 and when in position is locked in place by the stem 1. The recess 12 and the wedge 14 are formed to provide the maximum wedging effect at the lower or inner end of the hub 2, the wedge 14 being shaped to fit the recess 12 snugly with a minimum pressure on the rubber separating the bore 5 from the wedge 14 which cooperates to guide the end of the inflating tool to the periphery of the plug 14.

In Figs. 8-10 I have illustrated my invention as embodied in another type of valve. In the form shown in these figures, the hub 2 is formed with a tapered recess 15 which is of narrowest diameter at the top and of widest diameter at the inner end. At 16 I have shown a wedge member including a wedge-shaped head 17 presenting a shoulder 18 of a diameter substantially less than the widest diameter of the recess 15, which shoulder 18, when the wedge member 16 is in place, bears against the outer end of the hub 2 to cooperate in retaining the wedge member 16 in position. At 5 I have indicated the bore which extends into the wedge member 16 below the shoulder 18 below which bore 5 the member 16 is split as indicated at 19 to provide an air passage in communication with the bore 5. The recess 15 and the wedge member 16 are formed to provide the maximum wedging effect at the lower or inner end of the wedge 16 to tightly close the slit 19 at and adjacent this point. The head 17 may be forced through the recess 15 with relative ease due to the relation of the shoulder 18 and the bore 5 which permits the more ready compression of the head 17 and due to the fact that the wedge member 16 is shaped to effect only sufficient wedging pressure to hold the shoulder 18 in position during use.

In accordance with my invention valves may be readily assembled and while tightly sealed against the leakage of air, only a minimum frictional resistance is offered to the insertion and withdrawal of the inflating tool.

What I therefore claim and desire to secure by Letters Patent is:

1. An all rubber valve for inflatable articles comprising a flanged hub member having an air passage through the inner portion of said hub member, a bore through the outer portion of said hub member in communication with said passage, a wedge shaped recess in the inner end of said hub member on opposite sides of said passage defining a tip therefor, said recesses and said wedge members being shaped to effect a maximum pressure on said tip to seal said passage and a minimum closing pressure on said bore, each of said recesses laterally of the lower end of said bore being formed with pockets, the upper portion of each of said wedge members being formed with protuberances adapted to enter one of said pockets to retain said wedge members against dislodgment.

2. In a valve, a flanged hub member of rubber having an air passage therethrough adapted to receive an inflating tool and a tapered cavity laterally of said air passage and having its maximum width at its entrance through one end of said hub member and a wedge member in said cavity to seal said passage, and said wedge member being tapered to establish a cavity entering head smaller than said entrance.

3. In a valve, a flanged hub member of rubber having an air passage therethrough adapted to receive an inflating tool and a tapered cavity laterally of said air passage and having its maximum width at its entrance through one end of said hub member and a wedge member in said cavity to seal said passage, said wedge member being tapered to establish a cavity entering head smaller than said entrance, and means to lock said wedge member in said cavity.

4. In a valve, a flanged hub member of rubber having an air passage therethrough adapted to receive an inflating tool and a tapered cavity laterally of said air passage and having its maximum width at its entrance through one end of said hub member and a wedge member in said cavity to seal said passage, said wedge member being tapered to establish a cavity entering head smaller than said entrance, means to lock said wedge member in said cavity, and said locking means being of less width than said entrance.

5. An all rubber valve for inflatable articles comprising a flanged hub member having an air passage through the inner portion of said hub member, a bore through the outer portion of said hub member in communication with said passage, a wedge shaped recess in the inner end of said hub member on opposite sides of said passage defining a tip therefor, each of said recesses being formed with pockets, and a wedge member in each of said recesses the upper portion of each of said wedge members being formed with protuberances adapted to enter one of said pockets to retain said wedge members against dislodgment.

6. In a valve, a flanged hub member of rubber having an air passage therethrough adapted to receive an inflating tool and a cavity laterally of said air passage and disposed with its entrance through one end of said hub member, a member to be inserted in said cavity, and said cavity and said member being shaped to effect on the assembly of said valve the closing of said air passage with the maximum pressure exerted on the inner end of said air passage.

7. In a valve, a flanged hub member of rubber having an air passage therethrough adapted to receive an inflating tool and a cavity laterally of said air passage and disposed with its entrance through one end of said hub member, a member to be inserted in said cavity, the cavity entering end of said member being smaller than said entrance, and said cavity and said member being shaped to effect on the assembly of said valve the closing of said air passage with the maximum pressure exerted on the inner end of said air passage.

SOLON D. BOYNTON.